(12) United States Patent
Poretskin

(10) Patent No.: US 7,446,937 B2
(45) Date of Patent: Nov. 4, 2008

(54) INFLATABLE PROJECTION/IMAGING SCREEN STRUCTURE

(76) Inventor: Steven M. Poretskin, 1 S. Main St., S. Toms River, NJ (US) 08753

( * ) Notice: Subject to any disclaimer, the term of this patent is extended or adjusted under 35 U.S.C. 154(b) by 702 days.

(21) Appl. No.: 10/947,094

(22) Filed: Sep. 22, 2004

(65) Prior Publication Data
US 2005/0068618 A1    Mar. 31, 2005

Related U.S. Application Data

(60) Provisional application No. 60/506,422, filed on Sep. 29, 2003.

(51) Int. Cl.
*G03B 21/56* (2006.01)
*A47G 1/06* (2006.01)
*G09F 15/00* (2006.01)
*G09F 21/06* (2006.01)

(52) U.S. Cl. .................. 359/443; 359/461; 40/736; 40/610; 40/214

(58) Field of Classification Search .......... 359/443, 359/460–461; 40/736, 610, 214
See application file for complete search history.

(56) References Cited

U.S. PATENT DOCUMENTS 3,586,432 A * 6/1971 Pentes, Jr. ................ 353/74
3,754,342 A * 8/1973 Santacroce et al. ......... 40/477
4,369,591 A * 1/1983 Vicino ....................... 40/610
5,269,623 A * 12/1993 Hanson ........................ 404/6
6,008,938 A * 12/1999 Suehle et al. .............. 359/443
6,240,666 B1 * 6/2001 Apel et al. ................. 40/610
6,668,475 B2 * 12/2003 Carolan ..................... 40/610

FOREIGN PATENT DOCUMENTS

GB    2154762 A * 9/1985

* cited by examiner

*Primary Examiner*—W. B. Perkey
*Assistant Examiner*—Magda Cruz
(74) *Attorney, Agent, or Firm*—Clifford G. Frayne

(57) ABSTRACT

An inflatable structure for viewing video images or projected images, the inflatable structure comprised of a plurality of panels sewn or heat welded together to form a desired shape, the interior of the structure being constructed of a series of honeycomb/baffles or tubes for stability, the inflatable structure having an inlet port in communication with a blower unit for inflation of the structure, the inflatable structure having an outlet port for release of air pressure within the inflatable structure when desired, one face of inflatable structure being formed with a fastening means in order to secure a flexible resilient panel of white pigment or silver pigment or other desired pigment to form a screen onto which the video or projected image is projected.

6 Claims, 8 Drawing Sheets

INFLATABLE PROJECTION/IMAGING SCREEN STRUCTURE

RELATED APPLICATIONS

Applicant claims the benefit of provisional application Ser. No. 60/506,422, filed Sep. 29, 2003.

BACKGROUND OF THE INVENTION

1. Field of the Invention

The present invention relates to a projection/imaging screen, and in particular, to an inflatable projection/imaging screen structure that can be erected expeditiously in a variety of environments, including indoors and outdoors, which can be utilized by a large populous of people to view a film or image projected thereon.

2. Description of the Prior Art

Screens upon which to view video images have evolved from the turn of the century from small screens used in small theaters to view the silent movies to the large wrap around IMAX screens with surround sound which are presently found in some movie theaters throughout the world. In the interim period, the outdoor drive-in movie evolved, reached its peak in popularity, and now has become substantially extinct.

Similarly, television screens have evolved from the very small black and white screens of the embryonic television history to large screen TVs, home theaters, flat panel screens and high definition television. As the cost has come down, the size appears to increase. The movie theaters, and certain convention halls and the like have large, permanently installed screens upon which a video or projected image can be projected. However, if one wishes to project a video image or single image on a screen which is not permanently installed, such as in a movie theater, convention hall or the like, one must go to considerable expense and labor to construct an appropriate screen in an appropriate environment with necessary supports to stabilize the screen. This is particularly important if the screen is to be erected in an outdoor environment where it may be subjected to the vagaries of weather and climate, such as high wind, rain, etc. Screens of this type are often times erected for outdoor concerts and the like.

There has been a need for a screen upon which to view a video image or projected image which is of a large size so that it can be viewed by a large number of individuals and which can be erected quickly and safely, yet be compact and light weight for storage or transportation. Applicant's inflatable screen meets this criteria and allows for organizations or individuals to purchase, rent or lease the inflatable large screen and ancillary hardware in order to erect a screen for viewing video or projected images either in an outdoor environment, such as a park or stadium, or in an indoor environment, such as a gymnasium, meeting hall, conference center or the like. Applicant's inflatable screen is compact and easily transportable when not in use, and is quickly set up, and stabilized for establishing a screen for viewing video or projected images.

OBJECTS OF THE INVENTION

An object of the present invention is to provide for a novel inflatable screen upon which video or projected images can be projected for viewing by a large number of individuals.

A still further object of the present invention is to provide for a novel inflatable screen which is easily assembled and disassembled both in an indoor or outdoor environment and easily stabilized with a minimum amount of support cables or guy wires.

A still further object of the present invention is to provide for a novel inflatable screen for the viewing of video or projected images which can be constructed in varying shapes and sizes.

A still further object of the present invention is to provide for a novel inflatable screen for the viewing of video or projected images or the like in which the inflatable support for the screen is internally stabilized.

A still further object of the present invention is to provide for a novel inflatable screen which could be erected on a temporary basis and used for video imaging or projected imaging advertising in the manner of a permanently installed billboard.

A still further object of the present invention is to provide for a novel inflatable screen which does not require a heavy truss support system to maintain its position and which is easily disassembled and transported and stored.

SUMMARY OF THE INVENTION

An inflatable structure for viewing video images or projected images, the inflatable structure comprised of a plurality of panels sewn or heat welded together to form a desired shape, the interior of the structure being constructed of a series of honeycomb/baffles or tubes for stability, the inflatable structure having an inlet port in communication with a blower unit for inflation of the structure, the inflatable structure having an outlet port for release of air pressure within the inflatable structure when desired, one face of inflatable structure being formed with a fastening means in order to secure a flexible resilient panel of white pigment or silver pigment or other desired pigment to form a screen onto which the video or projected image is projected, the inflatable structure including a plurality of tie down securing points for receipt of a plurality of stabilizing means to maintain the inflatable structure in a stable position regardless of the environment, the inflatable structure being easily deflated, disassembled and stored or transported.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
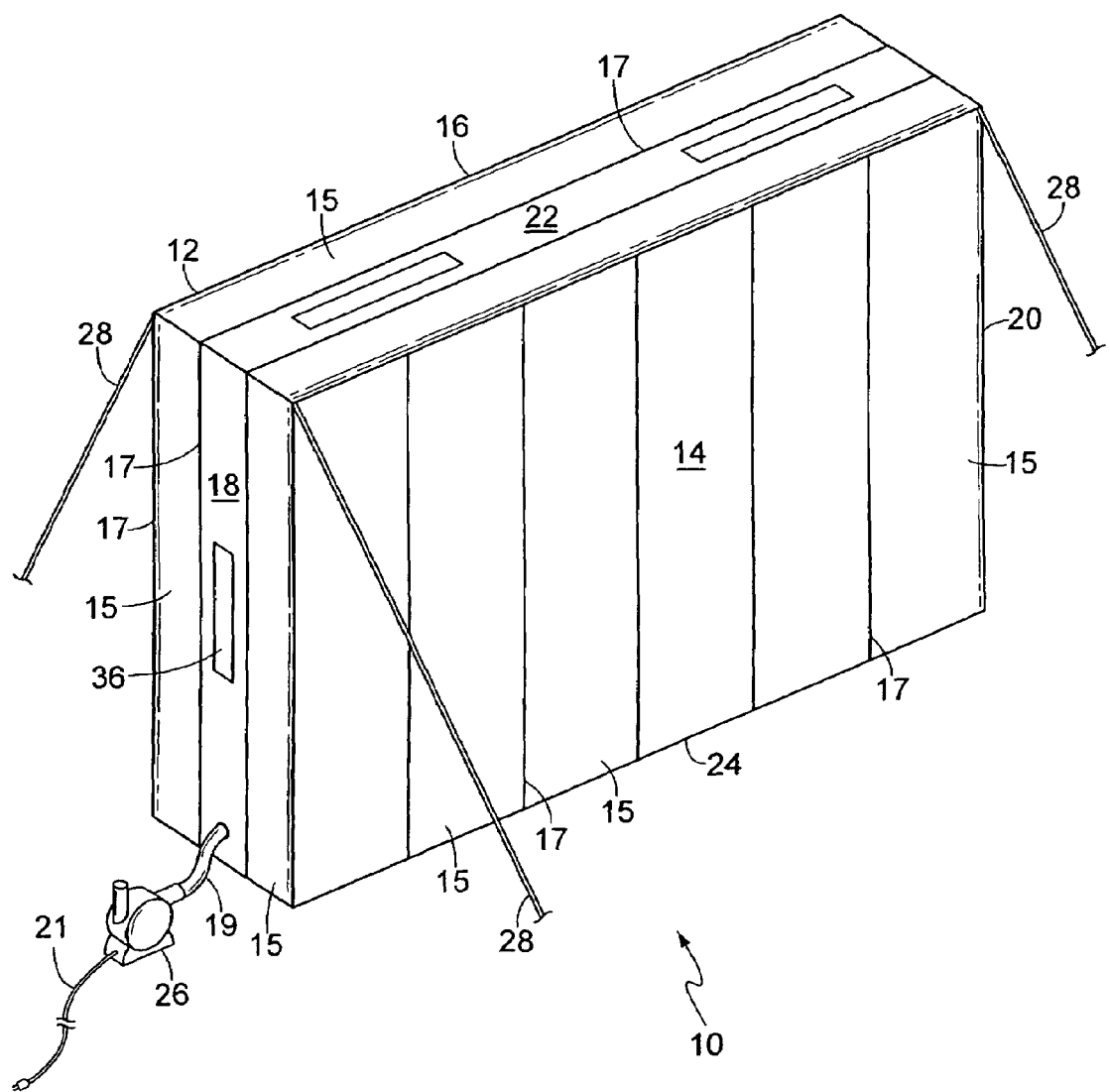
FIG. 1 is a perspective view of a first embodiment of the inflatable structure and screen.

FIGS. 1, 2, 3, and 4 are perspective, front, side and top views of a first embodiment of the inflatable projection/imaging screen structure 10 of the present invention. The inflatable projection/imaging screen 10 is fabricated of a series of panels 15 comprised of plastic vinyl or the like of approximate 10 mil thickness which can be sewn or heat welded together to form an inflatable structural housing 12 that is rectangular, but may be fashioned in another desired shape. In the present embodiment, the inflatable projection/imaging screen structure 10 is shown to be rectangular in shape having a front face 14, rear face 16, side faces 18 and 20, top face 22 and bottom face 24. The front, back, top, bottom and side faces are formed by a series of panels 15 which are sewn or heat welded along their periphery to form a plurality of seams 17. The inflatable projection/imaging screen structure 10 is in communication with a blower 26, which provides air to the interior of the inflatable projection/imaging screen structure 10 in order to inflate same. A sleeve member 19 integrally attached to a panel 15 forming a side face 18 or 20 is secured to the outlet of the blower which is in communication with a power source 21. A series of guy wires 28 attached to the inflatable projection/imaging screen structure 10 hold the inflatable projection/imaging screen structure 10 in position as it is being inflated and when it is fully inflated. Guy wires 28 are secured to a ballast 29. The blower unit 26 may operate during the entire period of inflation, or be used intermittently to maintain inflation of the inflatable projection/imaging screen structure 10.

In order to provide stability to the inflatable projection/imaging screen 10, a series of baffles, of honeycomb design 30 or tubular structure would be fabricated within the inflatable projection/imaging screen structure 10 in order to direct the air flow from the blower unit 26 and to provide a degree of stability and rigidity to the faces formed by the heat sewn or heat welded panels 15 forming the inflatable projection/imaging screen structure 10. One embodiment of such baffling system is illustrated in FIGS. 5 and 6, however, other embodiments could be utilized within the inflatable projection imaging screen structure 10 in order to achieve the desired stability and rigidity.

Figure 2:
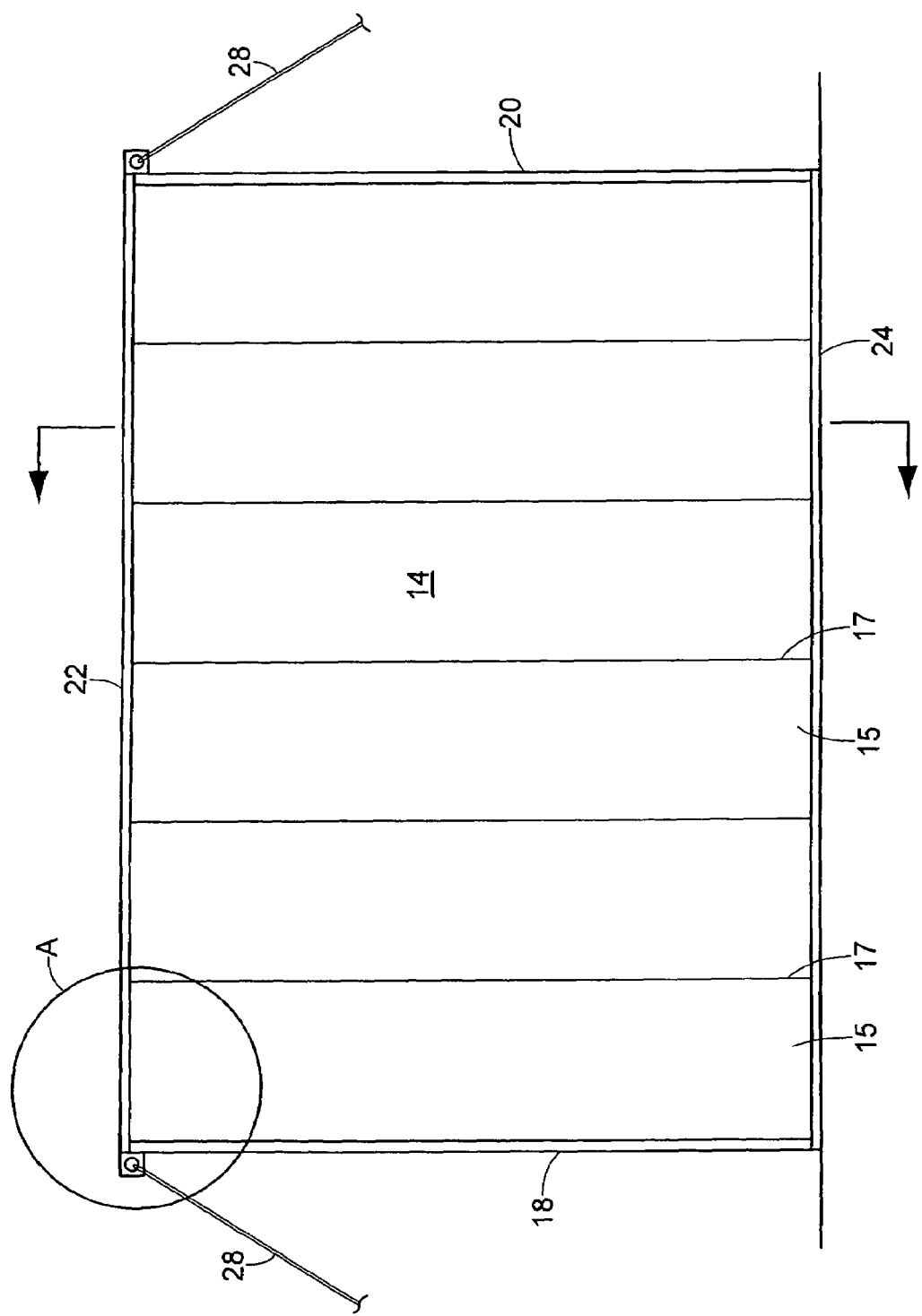
FIG. 2 is a front view of a first embodiment of an inflatable structure support.
Figure 3:
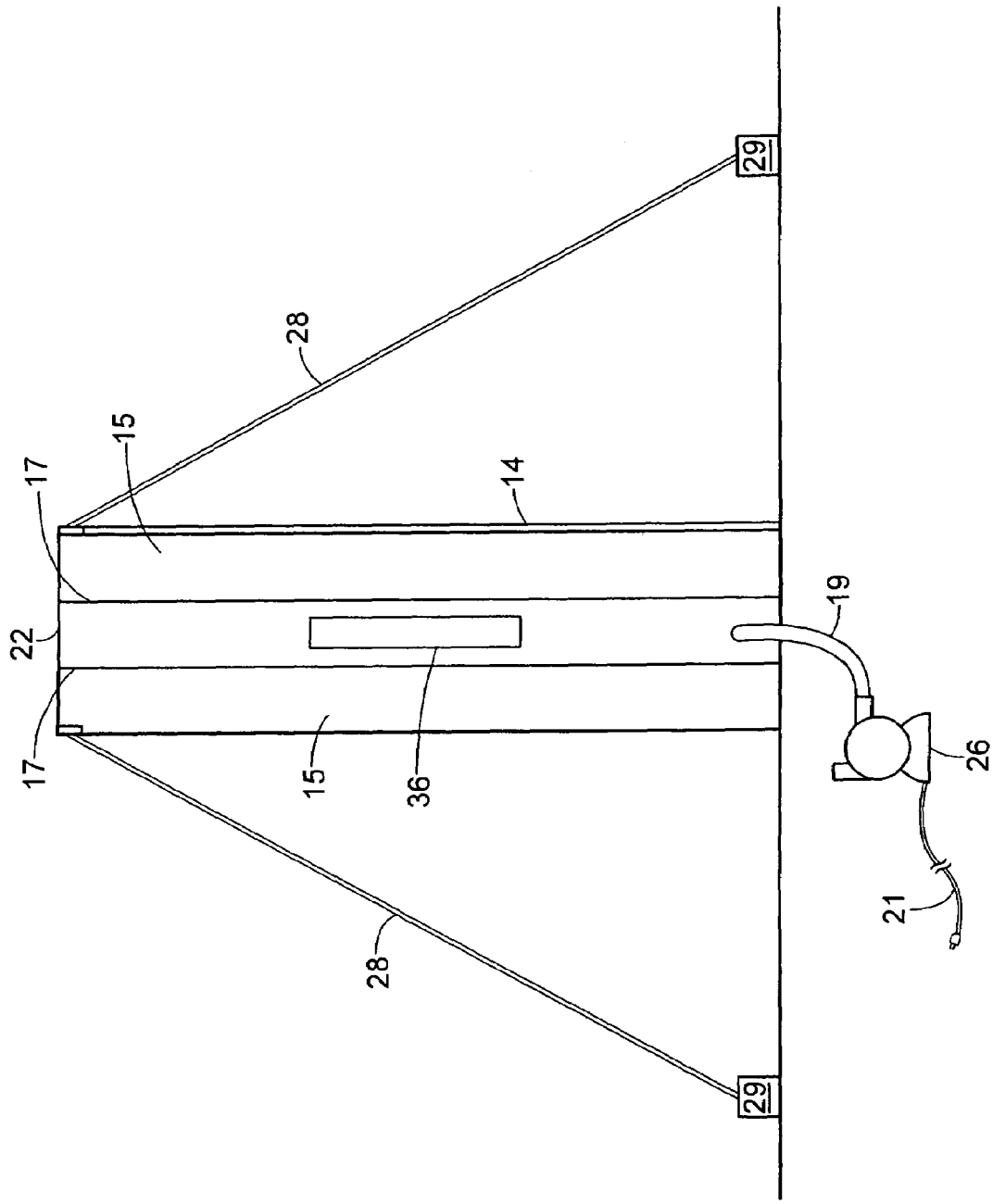
FIG. 3 is a side view of a first embodiment of the inflatable structure support and screen attachment.
Figure 4:
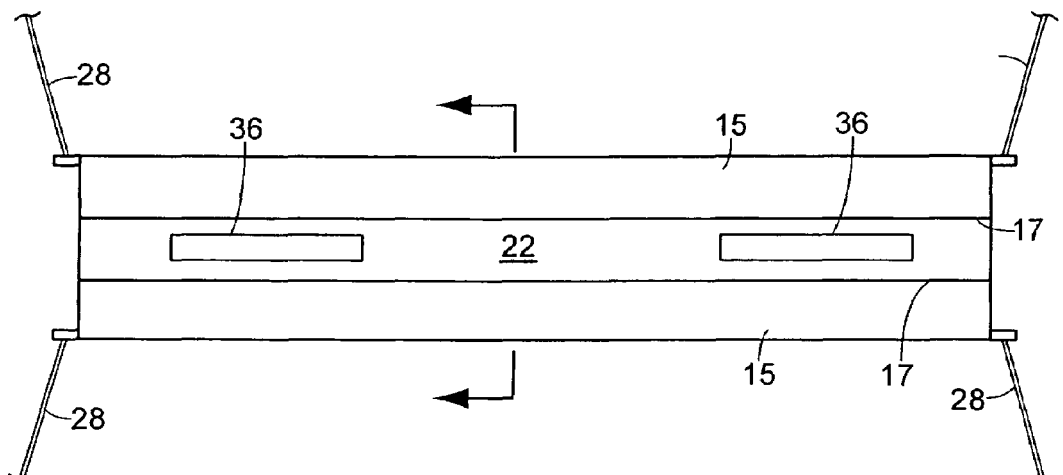
FIG. 4 is a top view of a first embodiment of the inflatable structure.
Figure 5:
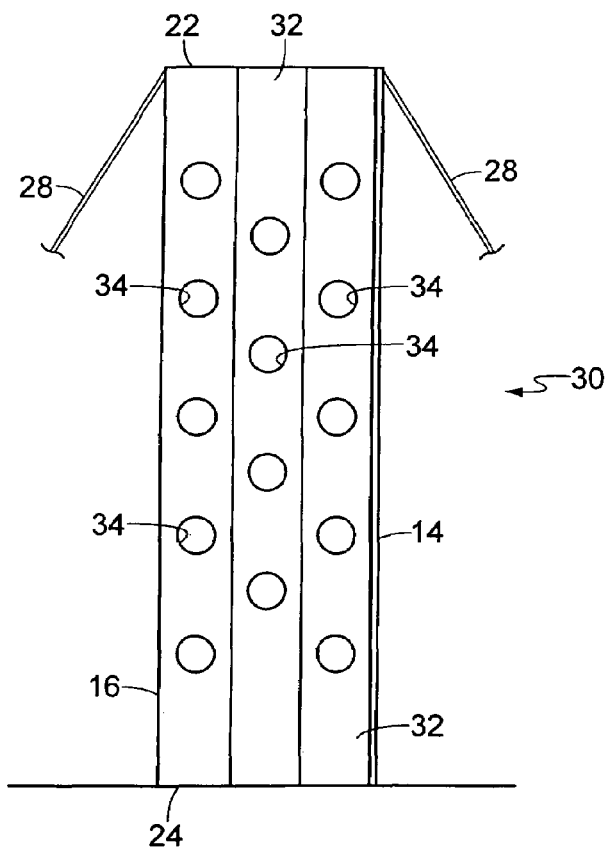
FIG. 5 is a cross sectional end view of FIG. 2 along plane 5—5 illustrating the interior honeycomb/baffle system.
Figure 6:
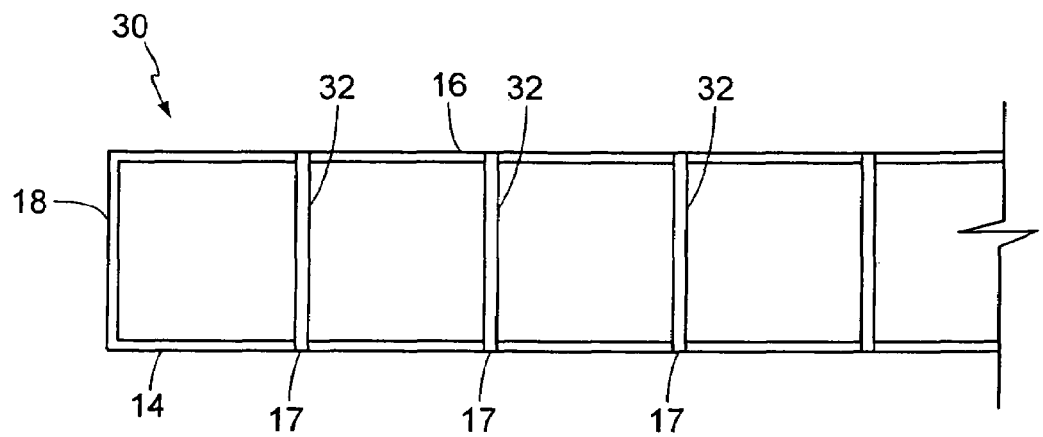
FIG. 6 is a cross section along plane 6—6 of FIG. 4 illustrating the interior honeycomb/baffle system.

FIGS. 5 and 6 are cross sectional views of the support structure 10 along planes 5—5 in FIG. 2 and along planes 6—6 of FIG. 4. A plurality of vertically oriented baffle panels 32 are disposed within the inflatable projection imaging structure 10 from the bottom face 24 to the top face 22 and are secured to front face 14 and rear face 16. These baffle panels 32 are constructed of the same material as the panels 15 forming the outer faces of the inflatable projection imaging screen structure 10. They are secured to the interior surface of the front face, rear face, top face and bottom face primarily at the seams 17 as illustrated in FIGS. 1 through 4 and again are sewn or heat welded. Each of the interior baffle panels 32 has formed there through a plurality of apertures 34 to allow for air flow from the blower 26 consecutively through the vertical chambers defined on the interior of the inflatable projection imaging screen structure 10 so as to gradually allow the full inflation of the inflatable projection imaging screen structure 10.

Also formed on the side faces 18 and 20 and the top face 22 of the inflatable projection imaging screen structure 10 are a plurality of sealable closure vents 36 which in the embodiment illustrated, are comprised of a plurality of zippers 38 which allow for the rapid deflation of the inflatable projection imaging screen structure 10 when opened. These vents 36 also allow for a certain amount of bleed off of air from within the inflatable projection imaging screen structure 10 during use to insure that it does not become over-inflated.

Figure 7:
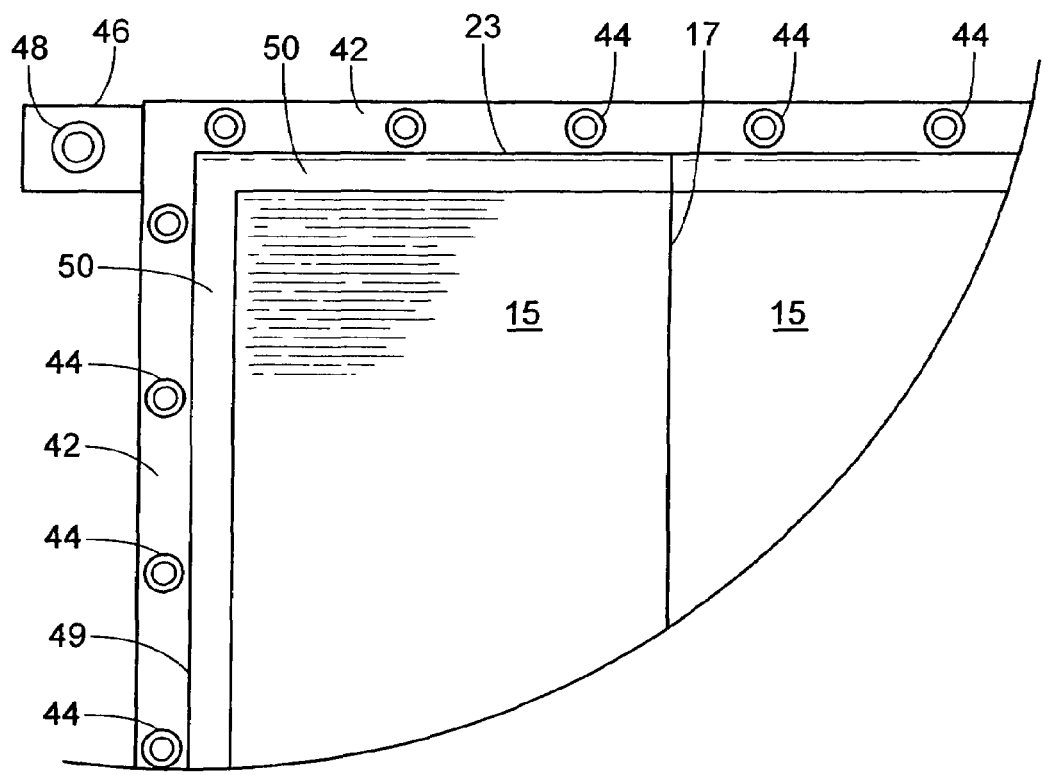
FIG. 7 is a close up view of portion of FIG. 2 illustrating the seaming and fastening means for the inflatable structure and screen.
Figure 8:
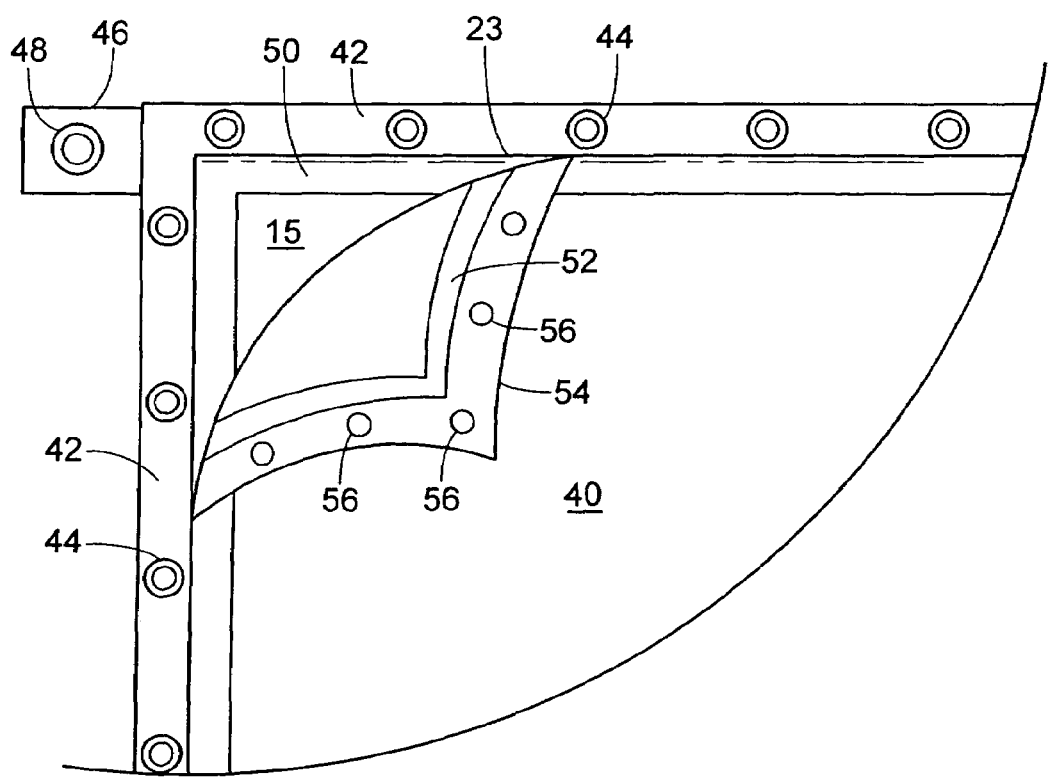
FIG. 8 is a close up view of a portion of a FIG. 2 illustrating the attachment of the screen.

FIG. 7 is a close up view of portion A of FIG. 2 and FIG. 8 is a close up portion of area A of FIG. 2 with screen member 40 being secured thereto. FIG. 7 illustrates a front panel member 15 secured to a side panel member 15 along seam 19 and front panel member 15 also being secured to a top panel member 15 along seam 23. The peripheral seams 19 and 23 are formed with a peripheral edging 42 which extends outwardly from the peripheral seams 19 and 23 and which has secured there through, a plurality of grommet members 44. Additionally, peripheral edging 42 may also have an extensible portion 46 having a grommet member 48 formed there through, said extensible portion 46 and grommet member 48 for securing a guy wire 28 or rope to the inflatable projection imaging screen structure to maintain its position when fully inflated. There may also be formed adjacent the peripheral seams 19 and 23, a strip of hook and loop fastener means 50 which would extend about the periphery of the front face 14 of the inflatable projection imaging screen structure 10. It should be noted that the edging 42 and associated grommet members 44 may also extend about the entire periphery of the inflatable projection imaging screen structure 10. The peripheral hook and loop fastening means 50 is designed to cooperate with an opposing hook and loop fastener means 52 which extends about the rear periphery 54 of screen member 40 which in turn secures a screen member 40 to the front face 14 of the inflatable projection imaging screen structure 10 (see FIG. 8). By securing screen member 40 to front face 14 of inflatable projection imaging screen structure 10 in this manner allows for the entire structure including screen member 40 to be erected simultaneously or to be deflated simultaneously and folded and stored for transport. The hook and loop fastening means 50 and 52 also provides for a method by which the screen member 40 can be removed from the inflatable projection imaging screen structure 10 in order to be cleaned. The pigmentation or color of the panels utilized to form the inflatable projection imaging screen structure 10 can be of any color and are of a design choice. However, the screen member 40 would preferably be fabricated of panels that would be of white or silver in color or pigmentation in order to receive the projection or image to be projected thereupon and to be viewed. Since the inflatable projection imaging screen structure 10 is designed for utilization both in an indoor and an outdoor environment, the screen member 40 can oftentimes become dirty or discolored necessitating its cleaning. The hook and loop fastening means 50 and 52 provides a facile means by which the screen member 40 can be separated from the inflatable projection imaging screen structure and cleaned or washed.

An alternative means by which the screen member 40 is secured to the front face 14 of the inflatable projection imaging screen structure 10 would utilize the grommet members 44 in the edging member 42 about the peripheral edging 42 of the front face 14 of the inflatable projection imaging screen structure 10 in cooperation with compatible grommets 56 which would be secured about the periphery of screen member 40 and would be secured by a suitable fastening means between complimentary grommets. This method is slightly more time consuming than utilizing the hook and loop fastener means, but nevertheless would be an alternative means for securing screen member 40 to the front face 14 of the inflatable projection imaging screen structure 10.

It should also be noted that in the embodiment heretofore discussed, the screen member 40 would be complimentary with the entire front face of the inflatable projection imaging screen structure 10. Without departing from the scope of the invention, the hook and loop fastener means 50 and 52 secured to the front face 14 of the inflatable projection imaging screen structure 10 could be spaced apart from the periphery of front face 14 such that the screen member 40 were centrally mounted on front face 14 with a margin existing between the periphery of screen member 40 and the periphery of front face 14 of inflatable projection imaging screen structure 10.

Figure 9:
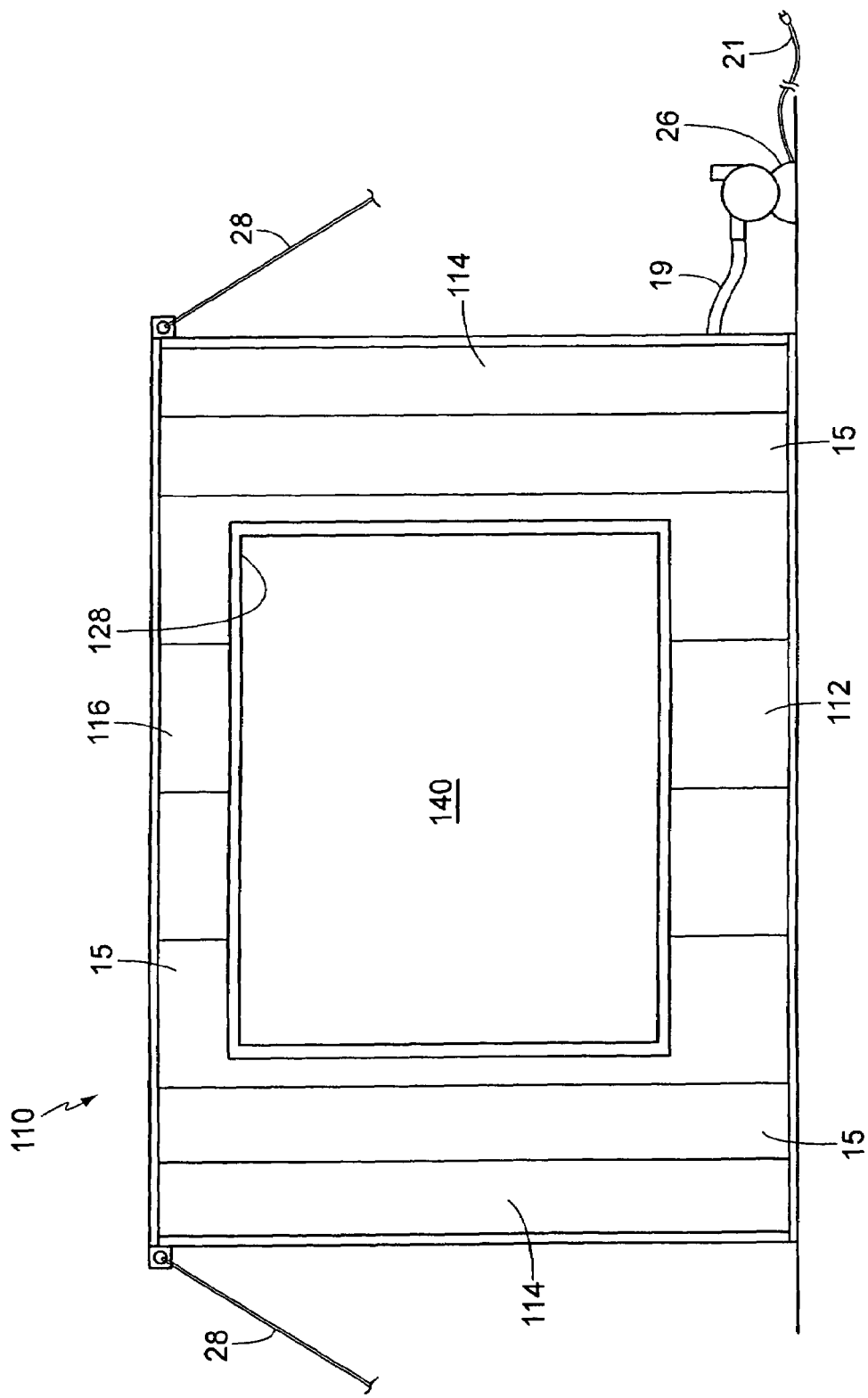
FIG. 9 is a front view of a second embodiment of the inflatable structure and screen.
Figure 10:
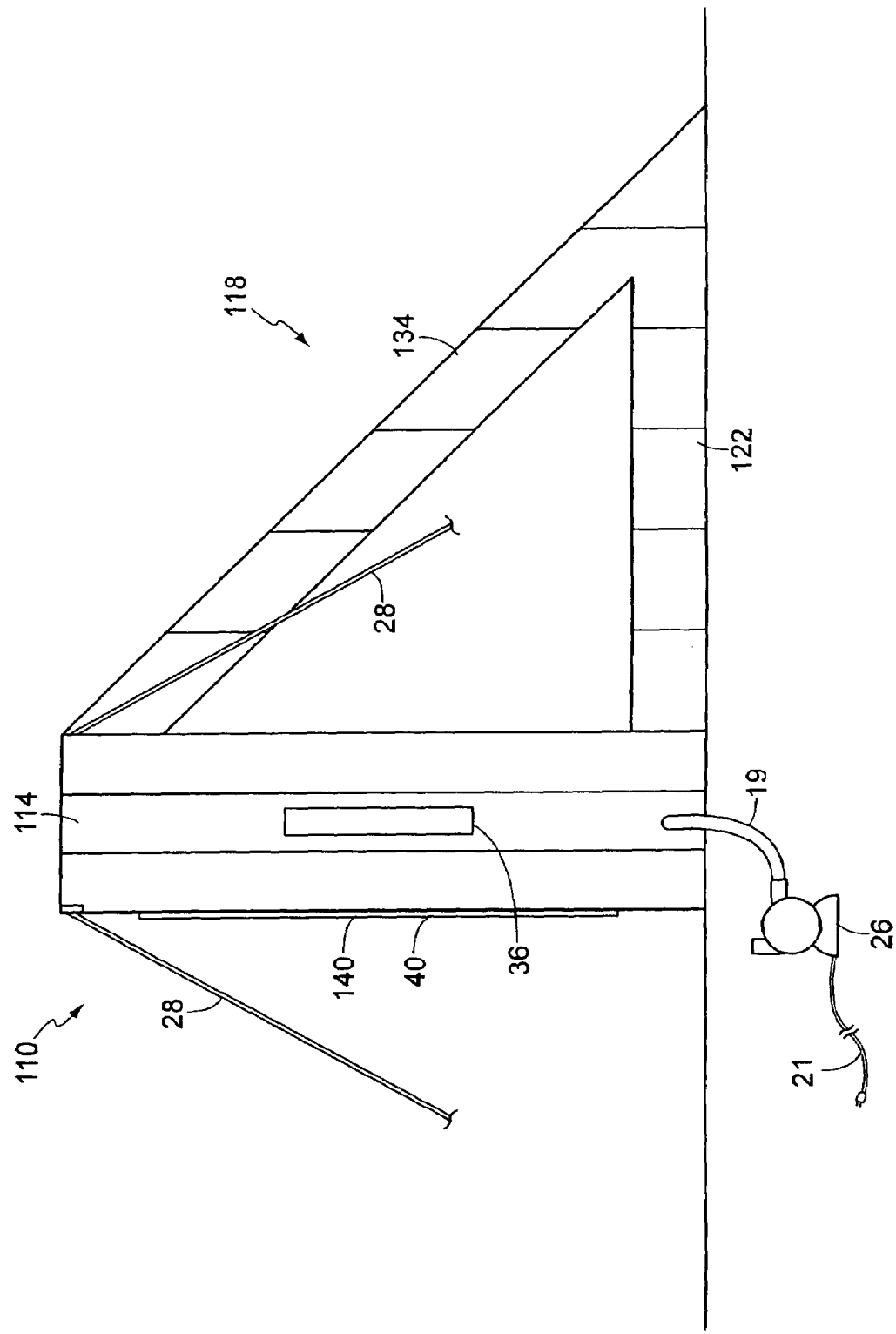
FIG. 10 is a side view of a second embodiment of the inflatable structure.

FIG. 9 is a front view of a second embodiment of an inflatable projection imaging screen structure 110 and FIG. 10 is a side view of such second embodiment. In this embodiment, the inflatable projection imaging screen structure 110 is formed with a plurality of panels that defines an inflatable frame having an inflatable, horizontal, lower leg 112, inflatable, vertical, side legs 114, and an inflatable, horizontal, upper cross leg 116. Depending rearwardly from the upstanding sidewall legs 114, are inflatable truss or gusset members 118 formed of a substantially horizontal lower leg 122, and an angled leg 124, extending from the lower leg 122 to the upper, horizontal, cross leg 116 of the inflatable frame. Inflatable projection imaging screen structure 110 thereby defines a rectangular aperture 128 within which a screen member 140 would be mounted.

The inflatable projection imaging screen structure 110 would be inflated and deflated in the manner similar to that heretofore described with respect to the first embodiment of the inflatable projection imaging screen structure 10. The second embodiment of the inflatable projection imaging screen structure 110 allows for screen member 140 to be secured to the periphery of aperture 128. The truss or gusset inflatable members 118 and 120 provide additional stability to the inflatable projection imaging screen structure 110, in addition to the associated guy wires similar to the first embodiment, but the fact that the screen member 140 is now secured within aperture 128 allows for the image to be projected onto screen member 140 to be projected from either the front orientation of the inflatable projection imaging screen structure 110 or from the rear orientation of the inflatable projection imaging screen structure 110. This provides the user with greater latitude as to the positioning of the audience when viewing the projected image.

The color of the panels utilized to fabricate the inflatable projection/imaging screen 10 or 110 could vary and is one of design choice. However, the screen surface 40 or 140 would be fabricated of panels that would be white or silver in color in order to receive the projection or image to be projected there upon.

Once the inflatable projection/imaging screen has been inflated, having the respective guy wires secured thereto to maintain its stability, particularly in an outdoor environment, the projector would be positioned at appropriate distance from the screen 40 or 140 and would project onto the screen panel 40 or 140, a movie, or advertising image or the like for viewing by a large populous.

In either of the embodiments discussed heretofore, it will be recognized by one of ordinary skill in the art that by disconnecting the blower unit, the inflatable projection/imaging screen 10 or 110 can quickly and easily be disinflated, the guy wires or support members can be disconnected and the inflatable projection/imaging screen structure 10 or 110 can be rolled and/or folded into a compact easily transportable or easily stored unit for transport or storage until further use is required. In this configuration, an individual or entity is allowed to erect the inflatable projection/imaging screen structure 10 or 110 in a variety of environments, project a movie image or the like onto the screen for viewing by a significant number of populous and uninflate, transport or store the inflatable projection/imaging screen structure 10 or 110 for further use or for further inflation at another location with minimal time and labor.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. An inflatable projection imaging screen structure for the projection of an image thereon comprising:
    a plurality of exterior panels sewn or heat welded together to form an inflatable structure having a front face, rear face, opposing side faces, top face and bottom face, said plurality of exterior panels and plurality of interior baffle panel members are fabricated from a flexible polymer of a thickness of 10 mils;
    a sleeve member secured to one of said exterior panel members and secured to a blower means, said blower means in communication with a power source, said blower means for the inflation of said inflatable projection imaging screen structure;
    a plurality of interior baffle panel members sewn or heat welded in communication with said front face and said rear face panels and said top face and said bottom face panels, said plurality of interior baffle panel members having a plurality of apertures there through for the direction and passage of air from said blower means, said interior baffle panel members providing internal structural integrity to said inflatable projection imaging screen structure;
    a screen member secured to said inflatable projection imaging screen structure for receipt of a projection of an image thereupon said screen member is secured to said inflatable projection imaging screen structure by means of a hook and loop fastener means wherein one portion of said hook and loop fastener means is secured about a periphery of a rear surface of said screen member and a compatible portion of said hook and loop fastener means is secured to said front face of said inflatable projection imaging screen structure in a matching periphery to said periphery of said screen member, said screen member secured to said compatible hook and loop fastener means on said front face of said inflatable projection imaging screen structure by contacting said hook and loop fastener means, said screen member and said hook and loop fastener means are contemporaneous with the periphery of said front face of said inflatable projection imaging screen structure; and
    a rigging means to maintain said inflatable projection image screen in an upright orientation.

2. The inflatable projection imaging screen structure in accordance with claim 1 wherein said screen member and said hook and loop fastener means are contemporaneous with said front face of said inflatable projection imaging screen structure for an area less than the periphery of said front face of said inflatable projection imaging screen structure.

3. The inflatable projection imaging screen structure in accordance with claim 1 wherein there is secured about a periphery of said front face and said rear face of said inflatable projection imaging screen structure, an outwardly depending edging, said edging having positioned there through a plurality of grommets about said periphery of said front face or said rear face of said inflatable projection imaging screen structure, said plurality of grommets selectively cooperative with said rigging means, said rigging means comprising a plurality of guy wires secured to said inflatable projection imaging screen structure and a ballast means to maintain said inflatable projection imaging screen structure in an upright and secure position.

4. The inflatable projection imaging screen structure in accordance with claim 1 wherein a plurality of deflation vents are positioned on the exterior panels forming the side faces and top faces of said inflatable projection imaging screen structure to facilitate deflation of the inflatable projection imaging screen structure.

5. The inflatable projection imaging screen structure in accordance with claim 1 wherein said plurality of exterior panels sewn or heat welded together to form a front face, rear face, side face, top face and bottom face define an aperture there through, said aperture having a periphery contemporaneous with said periphery of said screen member, said screen member being mounted in said aperture for projection of an image thereon from a direction of either said front face or said rear face of said inflatable projection imaging screen structure.

6. The inflatable projection imaging screen structure in accordance with claim 5 wherein said side faces have formed thereon, inflatable triangular shaped gussets defined by a rearwardly depending inflatable horizontal leg and an angularly disposed leg extending upwardly from said rearwardly disposed horizontal leg to an upper location of said side faces, said triangular shaped gusset members providing additional support in cooperation with said rigging means for said inflatable projection imaging screen structure.

* * * * *